United States Patent [15] 3,647,369
Riehm et al. [45] Mar. 7, 1972

[54] PROCESS FOR CONTINUOUSLY PRODUCING ALKALI METAL PHOSPHATES

[72] Inventors: Theodor Riehm; Oskar Gehrig, both of Mannheim, Germany

[73] Assignee: Benckiser-Knapsack GmbH, Ludwigshafen am Rhine, Germany

[22] Filed: Aug. 6, 1968

[21] Appl. No.: 750,499

[30] Foreign Application Priority Data

Aug. 10, 1967 Germany..............................B 93910

[52] U.S. Cl.................................................23/107, 23/106
[51] Int. Cl. ......................................................C01b 25/30
[58] Field of Search......................23/106, 107, 106 A; 71/43

[56] References Cited

UNITED STATES PATENTS

| | | | |
|---|---|---|---|
| 1,790,502 | 1/1931 | Hechenbleikner....................... | 23/107 |
| 2,811,419 | 10/1957 | Hartlapp et al.......................... | 23/107 |
| 2,898,189 | 8/1959 | Rodis et al............................... | 23/107 |
| 3,415,638 | 12/1968 | Hemsley et al........................... | 71/36 |
| 3,201,195 | 8/1965 | Huber...................................... | 23/107 |

FOREIGN PATENTS OR APPLICATIONS 557,623 5/1958 Canada....................................23/107

Primary Examiner—Oscar R. Vertiz
Assistant Examiner—Gregory A. Heller
Attorney—Erich M. Radde, Charles A. McClure, Gerard J. Weiser and Alfred Stapler

[57] ABSTRACT

Alkali metal ortho-, di-, or triphosphates or mixtures thereof are produced by continuously mixing concentrated phosphoric acid and alkali metal hydroxide solutions in a closed system, atomizing the resulting hot reaction mixture into a drying chamber by means of nozzles or the like atomizing means which are adapted, for instance, by properly selecting the orifice diameter of the nozzles, to maintain a minimum pressure preventing evaporation of water in the closed system, and drying of calcining the atomized reaction mixture in said drying chamber. A suitable equipment for carrying out this process is described. The process is more economical than the heretofore used processes.

5 Claims, 2 Drawing Figures

INVENTORS
THEODOR RIEHM
OSKAR GEHRIG

BY

Agent

3,647,369

PROCESS FOR CONTINUOUSLY PRODUCING ALKALI METAL PHOSPHATES

BACKGROUND OF THE INVENTION

1. Field of the Invention

The present invention relates to an improved process of producing alkali metal phosphates and more particularly alkali metal mono-, di-, or triphosphates, or mixtures thereof, by reacting phosphoric acid and alkali metal hydroxide solutions under predetermined pressure conditions and spray drying the reaction mixture.

2. Description of the Prior Art

It is known to produce sodium and potassium orthophosphates by drying clear solutions of said phosphates in a spray dryer. Diphosphates and triphosphates are conventionally produced by calcining such spray-dried orthophosphates in a rotary furnace.

Furthermore, it is known to produce tripolyphosphates such as sodium triphosphate of the formula $Na_5P_3O_{10}$ by drying in a spray dryer an orthophosphate solution in a proportion of $Na_2O:P_2OB5$ of 5:3. The resulting spray-dried product corresponds in its composition to the formula $2Na_2HPO_4 + NaH_2PO$. This mixture is either calcined to the triphosphate in a subsequently arranged rotating furnace. Or calcination is effected by a one-step process directly in the spray drier which is heated to calcining temperatures.

The most important, conventionally used process of producing alkali metal triphosphates comprises spray drying and spray calcining phosphate solutions of a solids content not exceeding 53 percent. Thereby about 69 kg. of solvent water must be evaporated on drying 100 kg. of alkali metal orthophosphates in a spray-drying tower. It is not possible to use a higher concentration of the starting solution because dialkali metal orthophosphate starts to crystallize at a higher concentration. Such premature crystallization yields, on subsequent calcination, products which contain not only the desired triphosphate but also larger amounts of diphosphate and also Maddrell's salt and trimetaphosphate.

To produce as pure a triphosphate as possible, requires calcination of a very finely crystalline and intimate mixture of mono- and dialkali metal orthophosphates. If these conditions are not observed, the mixture of mono- and dialkali metal orthophosphates yields, as calcination products, at least partly Maddrell's salt, trimetaphosphate, and tetra-alkali metal diphosphate.

Furthermore, in order to produce products of a low bulk density, it is known to add to the starting solutions expanding agents or propellants which are capable of causing gas generation on spraying, and/or to atomize the solutions under very high pressure by means of very fine nozzles with mist formation. Another method comprises adding propellant steam in a two-component atomizing nozzle or by means of rotating disks.

All these known processes require relatively large amounts of energy especially for vaporizing the water, and neutralization must be effected in a separate preceding operation.

SUMMARY OF THE INVENTION

It is one object of the present invention to provide a simple and effective process of producing in a single operation alkali metal ortho-, di-, or, respectively, triphosphates which process requires considerably less energy than the known processes.

Another object of the present invention is to provide a simple and effective system of carrying out said process, said system comprising a closed reaction equipment connected with a spray atomizer and a spray dryer or calciner.

Other objects of the present invention and advantageous features thereof will become apparent as the description proceeds.

In principle, the process according to the present invention comprises continuously mixing in a closed reaction equipment phosphoric acid of a $P_2O_5$ content between about 40 percent and about 65 percent and preferably of about 55 percent, with a 40 to 70 percent, and preferably with a 50 percent, alkali metal hydroxide solution and causing the hot mixture to become atomized through one or several nozzles of such a diameter that a predetermined minimum pressure which prevents evaporation of water in the closed reaction equipment is maintained. As a result thereof not only a. the heat of neutralization and dilution is fully utilized, but also b. a temperature is reached at which no premature crystallization takes place, c. a very fine atomization is achieved without additional steam, without propellant, without maximum liquid pressure, and without mechanical atomizing disks, and d. a homogeneous, microcrystalline mixture is obtained which, on subsequent calcination in a rotating furnace or in the same spray tower, yields products containing at least 97 percent of triphosphate.

The most important advantage of the process according to this invention is the fact that, due to the heat of neutralization and dilution generated during reaction, a large proportion of the water evaporates after atomization without the additional supply of heat. As a result thereof the energy requirements per 100 kg. of product are considerably reduced or, respectively, the output of a spray tower of a predetermined water evaporation rate is considerably increased. For instance, when using 50 percent sodium hydroxide solution and a phosphoric acid with a $P_2O_5$ content of about 55 percent, only 56 kg. of water must be evaporated for the production of 100 kg. of an orthophosphate mixture to be converted into the triphosphate. Heretofore, 89 kg. of water had to be evaporated. The savings in energy or, respectively, the increase in output achieved by the process according to the present invention is about 37 percent over that required when proceeding according to the known processes. It is understood, of course, that the savings in energy are still considerably higher when using more concentrated phosphoric acid and alkali metal hydroxide solutions.

BRIEF DESCRIPTION OF THE DRAWINGS

The attached drawings serve to illustrate the present invention and a highly useful system for carrying out the same. It is understood, of course, that the invention is not limited to the specific types of apparatus as illustrated but may be carried out in other types of apparatus as well. In said drawings FIG. 1 shows schematically a system wherein the reaction components are combined shortly before they enter the spraying nozzle and the spray dryer, while

Like index numerals in these FIGS. indicate the same parts of the apparatus.

DESCRIPTION OF THE PREFERRED EMBODIMENTS

Figure 1:
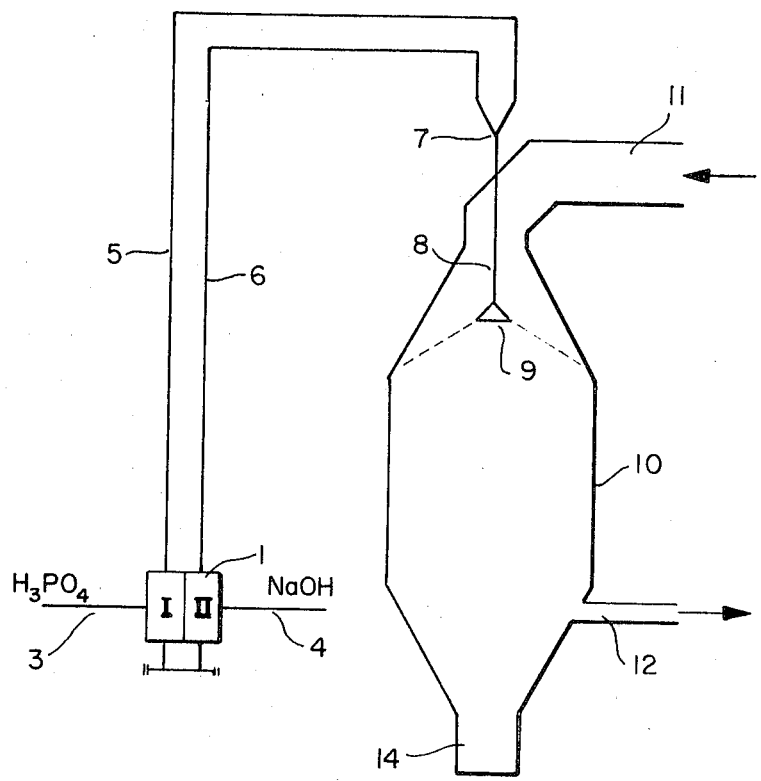

As shown in FIG. 1, the reaction components phosphoric acid and alkali metal hydroxide solution are supplied to twin plunger pump 1 through conduits 3 and 4 and are conducted via conduits 5 and 6 in predetermined molecular amounts in a closed system to junction 7 of said two conduits 5 and 6. Said junction 7 may be near or at the atomizing nozzle 9. Reaction takes place immediately in conduit 8 or in nozzle 9 whereby large amounts of heat of reaction are generated. As a result of such heat generation the reaction temperature as well as the pressure increase in the closed system without evaporation of the water present and formed in the reaction solution. This is achieved by selecting the diameter of spray nozzle 9 so that the pressure does not decrease in the system under the vapor pressure conditions created at the reaction temperature. Thus no evaporation takes place before the reaction mixture enters the spray nozzle. As a result thereof premature crystallization in the reaction mixture is prevented. The reaction mixture is then forced through conduit 8 into nozzle 9, causing its atomization into tower 10 provided with heating gas inlet 11 and waste gas outlet 12. The spray-dried or calcined phosphate produced thereby is discharged through discharge opening 14. The process according to the present invention permits to regulate spray drying or, respectively, spray calcination by varying the output of pump 1 and/or by varying the diameter of nozzle 9.

When using the simple system illustrated in FIG. 1, it cannot always be avoided completely that the ratio $Na_2HPO_4:NaH_2PO_4$ varies in the finely divided spray and that, as a result thereof, a triphosphate with a higher amount of trimetaphosphate or Maddrell's salt and also of diphosphate is formed.

Figure 2:
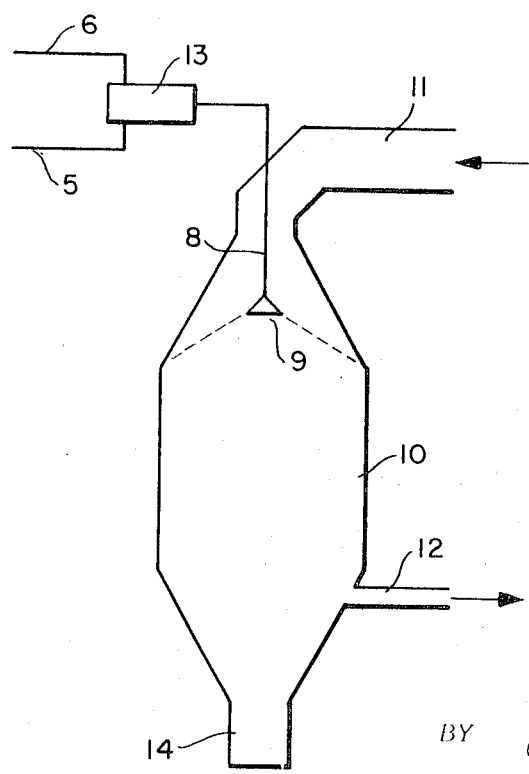
FIG. 2 shows schematically a system wherein the reaction components are combined and reacted in a separate mixing chamber and are then conducted to the spraying nozzle and the spray dryer.

This disadvantage is overcome by providing mixing chamber 13, as shown in FIG. 2, in the path of conduits 5 and 6 and before conduit 8 leading to nozzle 9. Said mixing chamber 13 may be filled, for instance, with Raschig rings or other material causing intimate mixing of the reactants. Mixing chamber 13 serves to equalize and eliminate the very slight periodic differences in concentration of the reactants as they are caused by the intermittently operating metering pump 1.

Of course, in place of such a twin-plunger pump 1, there may be employed a multiplunger twin pump which causes nonpulsating continuous flow of both reactants or any other pumping device assuring uniform, uninterrupted supply of the reactants to junction 7 or mixing chamber 13.

It is also possible to reduce the bulk density of the reaction product by increasing the pressure in the closed system. This is achieved, for instance, by using nozzles of a somewhat smaller diameter.

In general the nozzles which have proved to be especially suitable for the purpose of the present invention have a relatively large diameter in contrast to nozzles as they are used in conventional spray drying processes. The diameter of the nozzles depends on the amount of the reactant solutions charged to the system and is between about 10 mm. and about 40 mm., while the heretofore used nozzles were usually of a diameter of less than 10 mm. and actually of less than 5 mm. The pressure within the system is between about 10 atmospheres gauge and about 20 atmospheres gauge and preferably at about 15 atmospheres gauge. The temperature within the system attained by neutralization without evaporation is between about 170° C. and about 190° C. Of course, the system of metering pump 1, conduits 5 and 6, mixing chamber 13, is installed, and conduit 8 leading to nozzle 9 is insulated against heat losses.

It is understood that the process according to the present invention is not limited to the production of triphosphates but can also be employed with the same economical advantage in the neutralization and the drying of other phosphates obtainable by reaction of concentrated phosphoric acid and alkali metal hydroxide solutions. More particularly it has proved to be useful in the manufacture of mono-, di-, or trisodium orthophosphates, of sodium or potassium diphosphates, and others.

When producing mono-, di-, or trialkali metal orthophosphates, the concentration of the starting phosphoric acid and/or alkali metal hydroxide solution can even be selected so high that a certain amount of crystallization may occur before atomizing the reaction mixture. In contrast to the known spray-drying process wherein only a single component is atomized, the orifice diameter of the nozzle required for carrying out the process according to the present invention is considerably larger so that even the pressure of some crystals in the reaction mixture will not cause clogging of the nozzle.

The following examples serve to illustrate the present invention without, however, being limited thereto.

EXAMPLE 1

Five hundred liters of phosphoric acid (55% $P_2O_5$) and 535 l. of 50 percent sodium hydroxide solution are pumped per hour by metering pump 1 through conduits 5 and 6 into mixing chamber 13. The reaction mixture is forced through conduit 8 to nozzle 9 and is atomized in drying tower 10. The temperature in mixing chamber 13 is at about 180° C., the pressure in the closed system is about 15 atmospheres gauge. The heating gas entering spray dryer 10 through inlet 11 has a temperature of about 450° C. The temperature of the off-gas released through outlet 12 is about 150° C. The resulting sodium orthophosphate mixture is discharged through discharge opening 14. It has a bulk density of about 320 g./l. and can readily be calcined in a rotary furnace in a manner known per se to sodium triphosphate of the formula $Na_5P_3O_{10}$.

EXAMPLE 2

Four hundred liters of phosphoric acid (55% $P_2O_5$) and 760 l. of 50 percent sodium hydroxide solution are pumped per hour by twin plunger metering pump 1 through the system illustrated in FIG. 1 and are atomized in drying tower 10 by means of spray nozzle 9. The temperature of the heating gas introduced through inlet 11 is about 420° C., its exit temperature is about 155° C. A trisodium orthophosphate with about 40% $P_2O_5$ and a bulk density of about 450 g./l. is produced.

EXAMPLE 3

Four hundred fifty liters of phosphoric acid (55% $P_2O_5$) and 575 l. of 50 percent sodium hydroxide solution are pumped per hour by metering pump 1 through the system illustrated in FIG. 1 and are atomized by means of nozzle 9 in drying tower 10. The heating gas inlet temperature is about 410° C., its exit temperature is about 145° C. Thereby, disodium orthophosphate with about 49% $P_2O_5$ and a bulk density of about 380 g./l. is produced.

EXAMPLE 4

Five hundred fifty liters of phosphoric acid (55% $P_2O_5$) and 350 l. of 50 percent sodium hydroxide solution are pumped per hour by metering pump 1 through the system illustrated in FIG. 1 and are atomized by means of nozzle 9 in drying tower 10. The heating gas inlet temperature is about 350° C., its exit temperature is about 135° C. Thereby monosodium orthophosphate with about 59% $P_2O_5$ and a bulk density of about 390 g./l. is produced.

EXAMPLE 5

350 liters of phosphoric acid (55% $P_2O_5$) and 625 l. of 50 percent potassium hydroxide solution are pumped per hour by metering pump 1 through the system illustrated in FIG. 1 and are atomized by means of nozzle 9 in drying tower 10. The heating gas inlet temperature is about 410° C. its exit temperature is about 145° C. Thereby dipotassium orthophosphate with about 40% $P_2O_5$ and a bulk density of about 370 g./l. is produced.

EXAMPLE 6

Three hundred twenty liters of phosphoric acid (55% $P_2O_5$) and 855 l. of 50 percent potassium hydroxide solution are pumped per hour by metering pump 1 through the system illustrated in FIG. 1 and are atomized by means of nozzle 9 in drying tower 10. The heating gas inlet temperature is about 420° C., its exit temperature is about 150° C. Thereby, tripotassium orthophosphate with about 31% $P_2O_5$ and a bulk density of about 420 g./l. is produced.

EXAMPLE 7

Three hundred fifty liters of phosphoric acid (55% $P_2O_5$) and 375 l. of 50 percent sodium hydroxide solution are pumped per hour by metering pump 1 into mixing chamber 13 and through the system illustrated in FIG. 2. The reaction mixture is atomized by means of nozzle 9 in calcining tower 10. The temperature in mixing chamber 13 is about 180° C. and the pressure in the system is about 15 atmospheres gauge. The heating gas inlet temperature is about 850° C., its temperature at the exit outlet is about 400° C. Thereby, sodium triphosphate containing 97 percent of triphosphate is produced.

EXAMPLE 8

Three hundred forty liters of phosphoric acid (55% $P_2O_5$) and 435 l. of 50 percent sodium hydroxide solution are pumped per hour by metering pump 1 through the system illustrated in FIG. 1 and are atomized by means of nozzle 9 in drying tower 10. The heating gas inlet temperature is about 850° C., its exit temperature is about 400° C. Thereby, tetrasodium diphosphate with about 53% $P_2O_5$ of the formula $Na_4P_2O_{15}$ produced.

EXAMPLE 9

Three hundred forty liters of phosphoric acid (55% $P_2O_5$) and 540 l. of 50 percent potassium hydroxide solution are pumped per hour by metering pump 1 through the system illustrated in FIG. 1 and are atomized by means of nozzle 9 in drying tower 10. The heating gas inlet temperature is about 840° C., its exit temperature is about 400° C. Thereby, a mixture of about 70 percent of potassium triphosphate and 30 percent of potassium diphosphate is produced.

EXAMPLE 10

Seven hundred liters of phosphoric acid (40% $P_2O_5$) and 370 l. of 69 percent sodium hydroxide solution are pumped per hour by twin-plunger metering pump 1 through the system illustrated in FIG. 1 and are atomized by means of nozzle 9 in drying tower 10. The heating gas inlet temperature is about 410° C., its exit temperature is about 145° C. Thereby, disodium orthophosphate with about 49% $P_2O_5$ is produced.

EXAMPLE 11

Three hundred liters of phosphoric acid (65% $P_2O_5$) and 660 l. of 40 percent sodium hydroxide solution are pumped per hour by twin-plunger metering pump 1 through the system illustrated in FIG. 1 and are atomized by means of nozzle 9 in drying tower 10. The heating gas inlet temperature is about 420° C., its exit temperature is about 145° C. Thereby, disodium orthophosphate with about 49% $P_2O_5$ is produced.

Spray-drying or spray calcination tower 10 may vary in size and diameter depending upon the required output. A tower as used in the above given examples has, for instance, a height of 10 m. and a diameter of 4.2 m. The inlet and exit temperatures of the heating gas are, of course, dependent on the construction of the tower, for instance, on the proportion of its height to its diameter. The heating gases may not only be introduced into the tower concurrently with the atomized reaction mixture but also countercurrently thereto. Dust separators are also provided to separate any phosphate dust carried along with the off-gas. The heating gases may be the combustion gases of a gas or oil burner or they may be the off-gases from a separate polyphosphate calcination furnace.

Although the equipment and process according the present invention have proved to be especially useful in the production of various kinds of alkali metal phosphates, they can also be used advantageously in the economic production of other water soluble salts of water soluble inorganic and organic acids with water soluble basic salt-forming agents.

Of course, many changes and variations in the concentration and the amounts of the phosphoric acid and alkali metal hydroxide solution reacted, the temperature and pressure in the closed system and mixing chamber before atomization, the type of nozzles used and their orifice diameter, the size, height, and diameter of the spray drying or spray calcination tower, the temperature of the heating gases, and the like may be made by those skilled in the art in accordance with the principles set forth herein and in the claims annexed hereto.

We claim:
1. In a process of producing alkali metal phosphates by reacting phosphoric acid with an alkali metal hydroxide solution, spraying the resultant alkali metal phosphate solution into a drying chamber, and drying it therein, the improvement which consists in
   a. continuously pumping via a closed system to the atomizing system and thereby contacting and mixing
   b. a stream of phosphoric acid of about 40 percent to about 65 percent phosphorus pentoxide and a stream of an about 50 percent to about 70 percent metal hydroxide solution,
   c. said phosphoric acid and said alkali metal hydroxide solution being mixed in molar amounts corresponding to the amounts required to yield the desired alkali metal orthophosphate, the heat of reaction of the mixture providing
   d. a pressure between about 10 atmospheres gauge and about 40 atmospheres gauge and a temperature between about 170° C. and about 190° C. in said closed system and preventing steam formation therein, and
   e. continuously atomizing the resulting reaction solution into a drying chamber to produce the substantially dry alkali metal phosphate.

2. The process as defined in claim 1, wherein the phosphoric acid is an acid of about 55% $P_2O_5$ and the alkali metal hydroxide solution is a solution of about 50 percent alkali metal hydroxide.

3. The process as defined in claim 1, wherein the phosphoric acid and the alkali metal hydroxide are mechanically mixed in the closed system.

4. The process as defined in 1, wherein atomizing is effected by continuously passing the reaction mixture through atomizing nozzles of an orifice diameter of at least 10 mm.

5. The process as defined in claim 1, wherein atomizing is effected by continuously passing the reaction mixture through atomizing nozzles of an orifice diameter between about 10 mm. and about 40 mm.

* * * * *

PO-1050
(5/69)

UNITED STATES PATENT OFFICE
CERTIFICATE OF CORRECTION

Patent No. 3,647,369      Dated March 7, 1972

Inventor(s) Theodor Riehm and Oskar Gehrig

It is certified that error appears in the above-identified patent and that said Letters Patent are hereby corrected as shown below:

Page 1, right-hand column, line 5 from bottom: "of" should read -- or --. Column 1, line 22: The formula should read -- $Na_2O:P_2O_5$ --; line 24: The formula should read -- $NaH_2PO_4$ --. Column 3, line 47: "is" should read -- if --. Column 5, line 14: The formula should read as follows: -- $Na_4P_2O_7$ --. Column 6, line 48: After "in" insert -- claim --.

Signed and sealed this 27th day of June 1972.

(SEAL)
Attest:

EDWARD M. FLETCHER, JR.
Attesting Officer

ROBERT GOTTSCHALK
Commissioner of Patents